(12) United States Patent
Shigemori

(10) Patent No.: US 6,466,963 B1
(45) Date of Patent: Oct. 15, 2002

(54) AGENT SYSTEM WITH PRIORITIZED PROCESSING OF MOBILE AGENTS

(75) Inventor: Yutsuka Shigemori, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/290,411

(22) Filed: Apr. 13, 1999

(30) Foreign Application Priority Data

Apr. 13, 1998 (JP) .......................................... 10-101538

(51) Int. Cl.$^7$ .............................................. G06F 15/16
(52) U.S. Cl. ...................... 709/202; 709/207; 709/223; 709/228; 709/317
(58) Field of Search ........................ 709/200, 202–203, 709/206–207, 217–219, 227–228, 223–224, 232, 238–239, 310, 317

(56) References Cited

U.S. PATENT DOCUMENTS

| | | | | |
|---|---|---|---|---|
| 5,999,183 A | * | 12/1999 | Kilgariff et al. | 345/418 |
| 5,999,965 A | * | 12/1999 | Kelly | 709/202 |
| 6,065,039 A | * | 5/2000 | Paciorek | 709/202 |
| 6,085,238 A | * | 7/2000 | Yuasa et al. | 709/202 |
| 6,157,941 A | * | 12/2000 | Verkler et al. | 709/202 |
| 6,175,855 B1 | * | 1/2001 | Reich et al. | 709/202 |
| 6,175,868 B1 | * | 1/2001 | Lavian et al. | 709/223 |
| 6,195,705 B1 | * | 2/2001 | Leung | 709/202 |
| 6,233,601 B1 | * | 5/2001 | Walsh | 709/202 |
| 6,282,563 B1 | * | 8/2001 | Yamamoto et al. | 709/202 |

FOREIGN PATENT DOCUMENTS

EP 0 634 719 A2 1/1995 ............. G06F/9/46

OTHER PUBLICATIONS

Wong et al.; "Concordia: An Infrastructure for Collaborating Mobile Agents"; Mitsubishi Electric ITA, Horizon Systems Laboratory, Waltham, MA, 1997, pp. 86–97.

Rothermel et al; "The Architecture of the Ara Platform for Mobile Agents"; First International Workshop on Mobile Agents, 1997, 12 total pages.

* cited by examiner

Primary Examiner—Bharat Barot
(74) Attorney, Agent, or Firm—Dickstein Shapiro Morin Oshinsky LLP (57) ABSTRACT

This invention provides an agent system that can easily detect an error in the system, and that can prioritize agents to be processed. This invention makes the agent system more flexible than the prior art. In order achieve this object, each agent according to this invention has an ID and priority number to prioritize the processing of the agent in the designated device. Once this agent is transmitted to the designated device, the agent is processed according to the priority number when the designated device has more than two agents.

6 Claims, 8 Drawing Sheets

AGENT SYSTEM WITH PRIORITIZED PROCESSING OF MOBILE AGENTS

FIELD OF THE INVENTION

This invention concerns an agent system in which an agent generated by an agent server is moved consecutively among communication devices via communication lines. In this agent system, a mobile agent with an individual priority is transmitted from the system server to another system server at a destination.

BACKGROUND OF THE INVENTION

Figure 8:
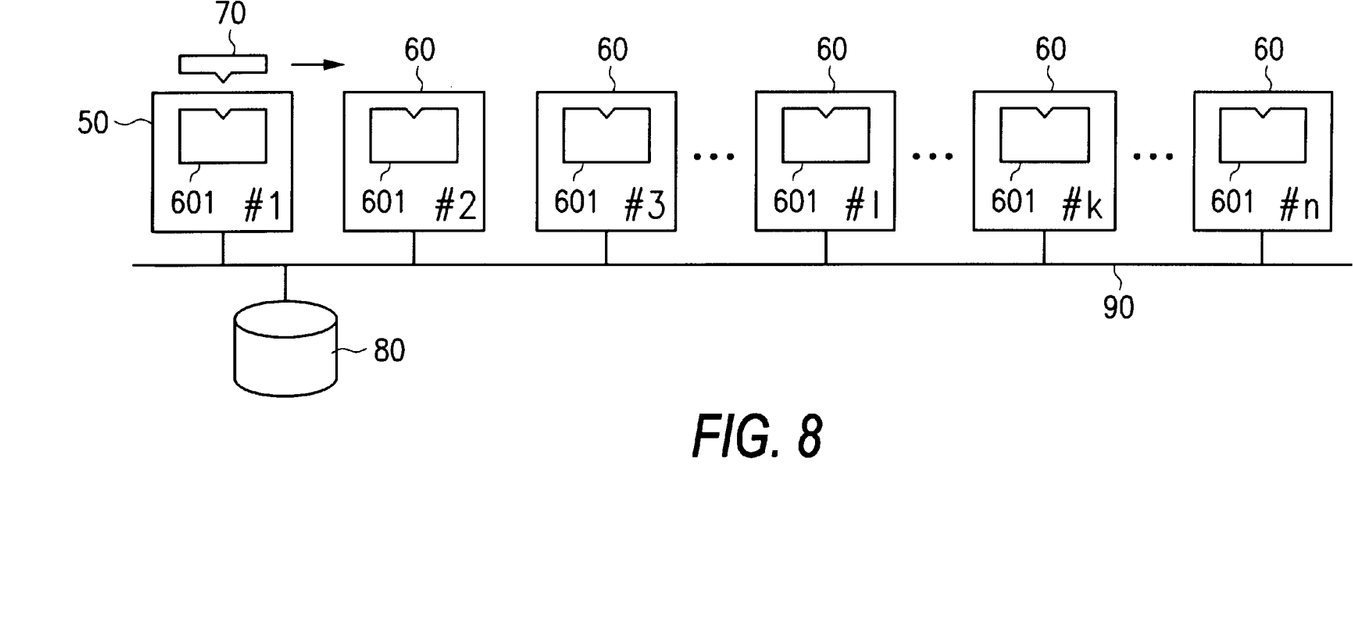
FIG. 8 shows a typical block diagram of an agent system according to the prior art.

A typical agent system of the type which has recently been proliferating is shown in FIG. 8. Agent server 50, various communication devices 60 (personal computers, work stations, etc.) and storage device 80, which stores a program to generate agents, are all connected via cable line 90 (or, although not pictured, they may be connected cordlessly). This line 90 is used to transfer agent 70, which we shall discuss shortly, from one device to the next.

In such an agent system, agent server 50 generates, based on a source program, an agent 70 consisting of object code. The agent 70, which has been generated, is transmitted to a designated communication device 60, where the system agent 601 for that device 60 executes it.

Agent systems of the sort described above use two methods to transmit an agent 70. In a first method, the agent is given its destination and target processing but not the route by which it is to reach the destination. In a second method, the agent is given only its target processing and does not receive either its destination or its transmission route.

Regardless of whether the agent is given both its destination and its target processing or only its target processing, certain problems are inherent in the type of agent system described above.

In the first method mentioned above, in which agent 70 is given both its destination and its target processing, when the agent is to be routed through the nodes of a number of specified devices 60, each node will have to be specified, as there is a 1 to 1 correspondence of destinations when the target processing is executed.

Thus if the target processing cannot be accomplished, agent server 50 will have to respecify all of the destinations, which will result in dead time.

In the second method mentioned above, in which the agent is given only its target processing, it will move to an arbitrary location (searching according to a rule) and execute that processing. Once it is given its target processing, the agent will never need to have its target reassigned. However, there is no way to choose a route, so if the processing is sequential, and there is, for example, an application gateway in a fire wall, the attempt of the agent to pass through will be regarded as an access violation. The agent will be unable to continue to the nodes of the devices 60 on the other side of the firewall.

In either method mentioned above (the one in which the agent is given both a destination and the target processing or the one in which it is given only the target processing), agent 70 sets out without knowing the resource state of its destination, device 60. For example, it does not know which regions of the device's memory are free. If it turns out that the agent is temporarily unable to use the resources of device 60 because, say, there is no free area in the memory to house it, agent 70 will not be generated in that device. It will not return to server 50 within the specified time, and server 50 will have no alternative but to execute error processing.

In order to solve the problems mentioned above, the applicant filed a patent application disclosing the following invention on Mar. 26, 1999.

In this application, the aforesaid communication devices 60 modify the routing data, if necessary, for the agent which was received previously, and restore the agent. This configuration eliminates the need to respecify destinations for the agent. It enables the agent to reach the target destination without routing a specific node. It also checks the resource state of its destination in advance before the agent is transmitted in order to avoid error processing.

Figure 9:
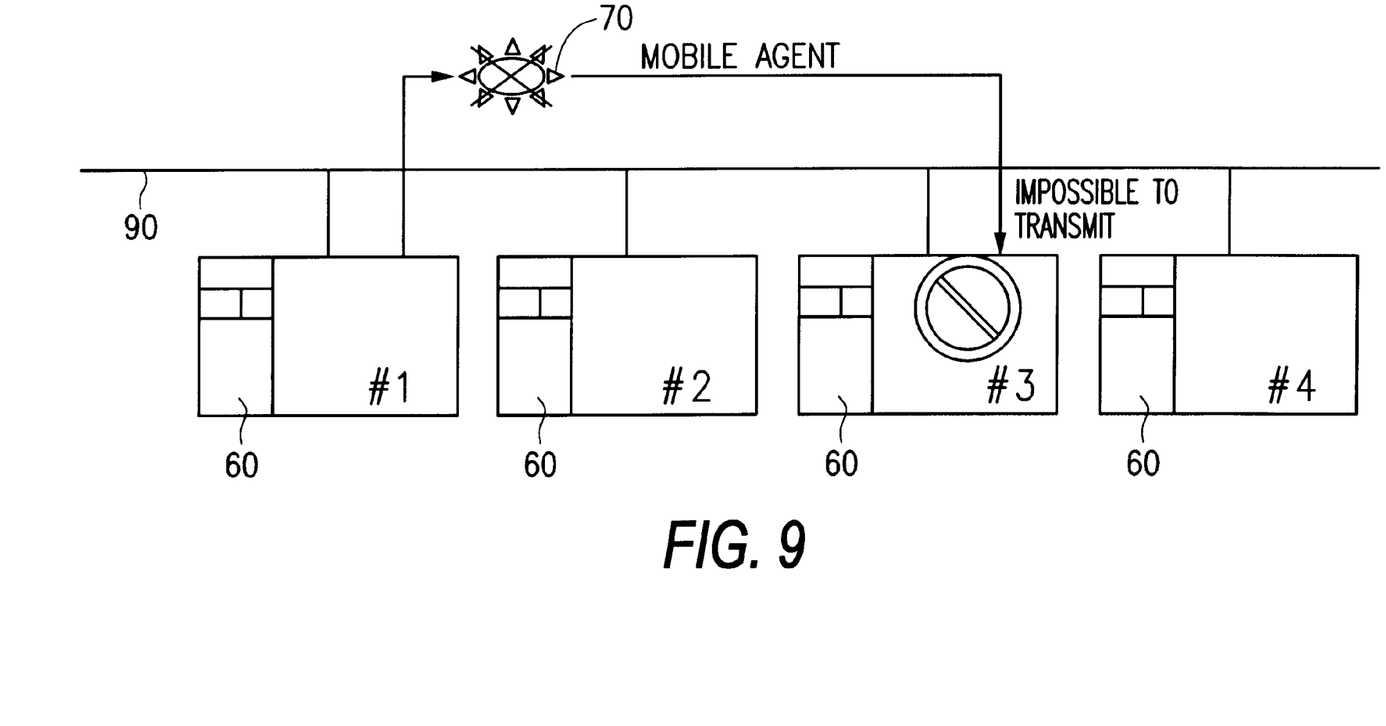
FIG. 9 is a block diagram of a typical agent system in which a mobile agent cannot reach its intended device.

The following problem is, however, inherent in the invention mentioned above. The processing time to execute the agent 70 at the designated communication device 60 with node number 3 is not considered in this configuration. As shown in FIG. 9, after the agent 70 is transmitted from node number 1, if an error occurs in the device 60 with node number 3 while the agent 70 is on the way, the agent has no way to reach to the device 60 with node number 3, and will disappear before it reaches there. This means there is no way to notify to the device 60 with node number 1 that an error occurred at node 3. Because of this configuration, there is an inherent problem with the time required for detecting an error in the system.

Figure 10:
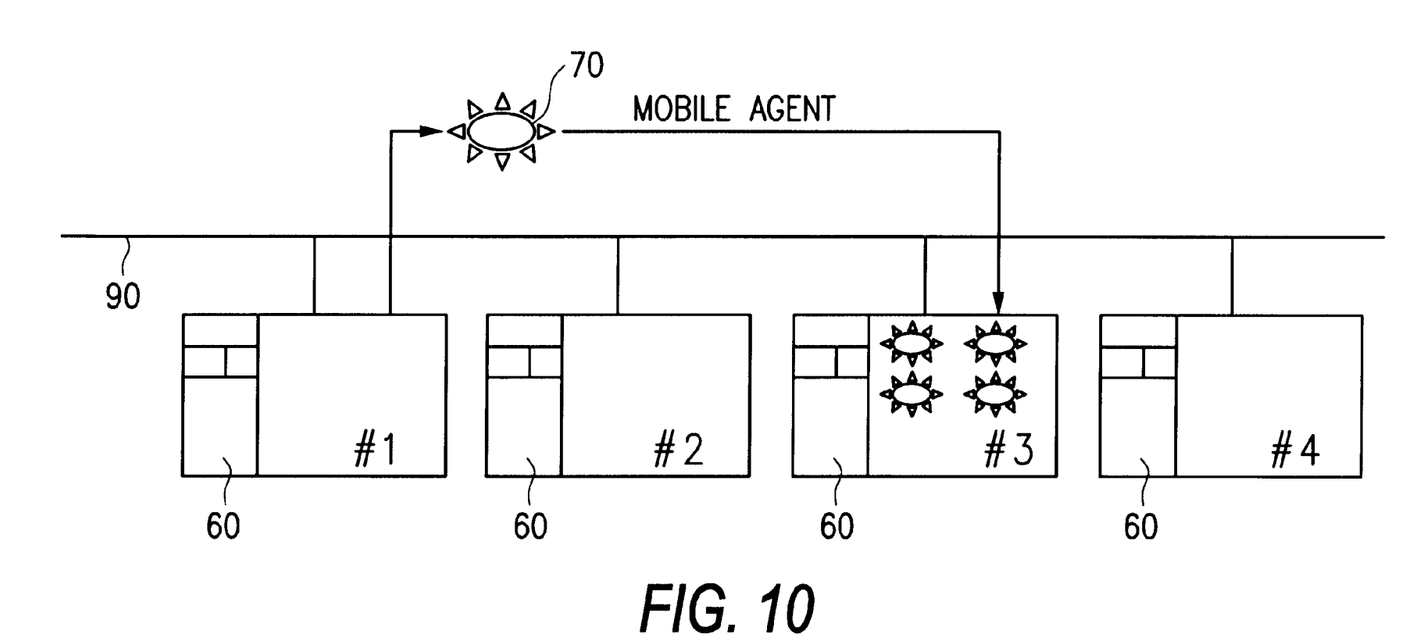
FIG. 10 shows a block diagram of a typical agent system in which mobile agents on the same device are not prioritized.

Another problem in this system is that it can not prioritize the processing of agents when there are a number of agents 70 at a device such as the device 60 with node number 3 as shown in FIG. 10. This is because the agents are processed according to the order they are input.

SUMMARY OF THE INVENTION

An object of this invention is to provide an agent system that can easily detect an error in the system and that can prioritize the agents to be processed.

In order achieve this object, each agent according to this invention has an ID and priority number to prioritize the processing of the agent in the designated communication. Once this agent is transmitted to the designated device, the agent is processed according to the priority number when the designated device has more than two agents.

The agent server has a priority inquiring means to inquire as to the priorities of other agents that are already in the designated agent before the agent server transmits the agent to the designated device.

With this invention, a priority altering means alters the priority number of an agent once the agent server receives information about the priorities of other agents in the designated device by the priority inquiring means.

This invention also has a time out detecting means to detect if a mobile agent is executed within a predetermined time period, and an error detecting means to detect an error at a designated communication device by counting the number of times the agent is resent, and to judge if there is an error in the processing.

DETAILED DESCRIPTION OF THE INVENTION

In this section we shall explain the agent system according to this invention with reference to the drawings.

Figure 1:
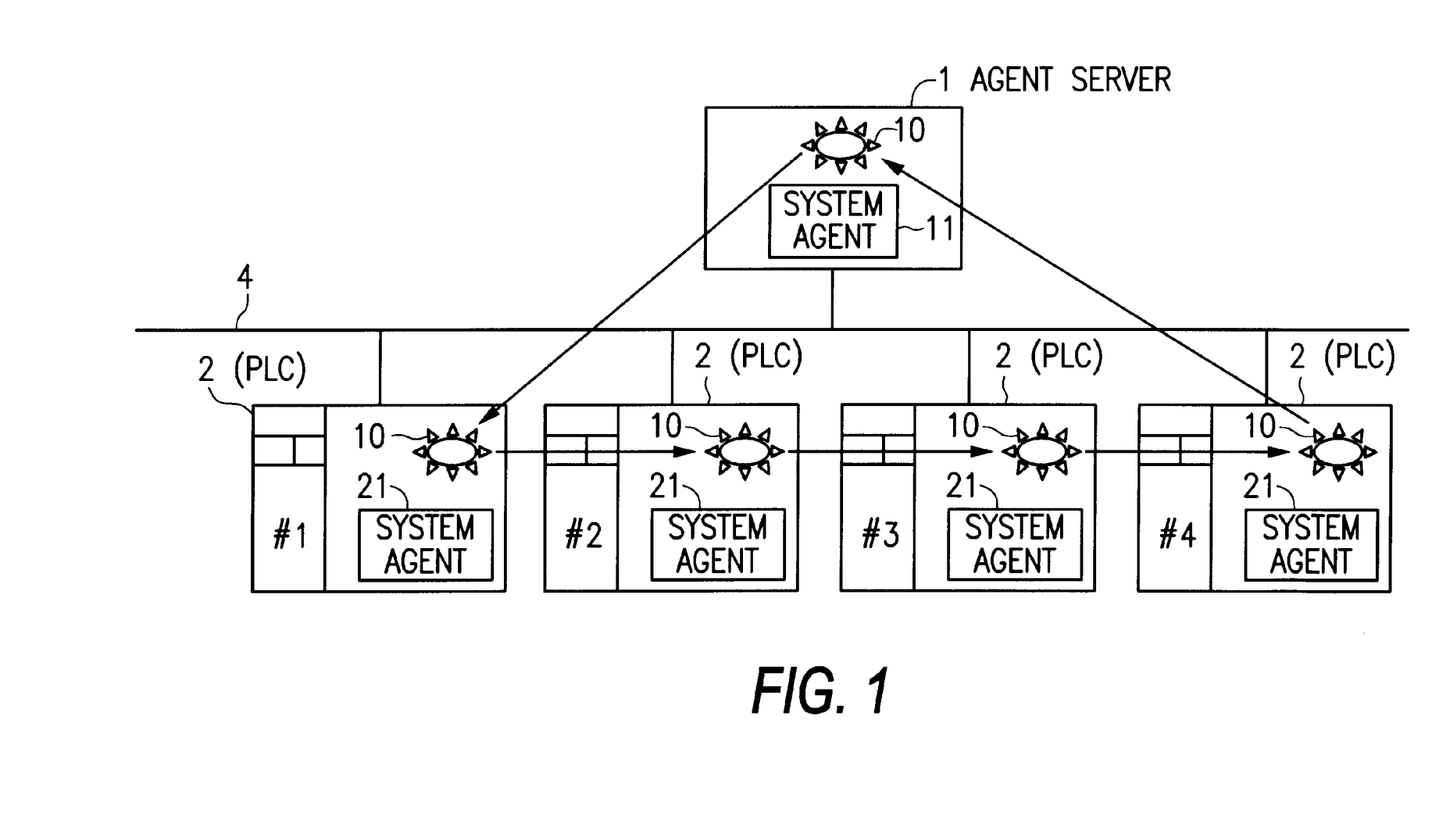
FIG. 1 is a block diagram of a preferred embodiment of an agent system according to this invention.

FIG. 1 is a block diagram of a preferred embodiment of an agent system according to this invention.

As is shown in FIG. 1, the agent system comprises agent server 1 and a number of communication devices 2, whose node numbers are 1–4. These devices are connected via communication network 4, which may be a cable or cordless medium.

Agent server 1 includes system agent 11. The system agent 11 generates agent 10 which consists of object code and executes a specified processing at node number 1–4 which is its purpose (hereinafter referred to as "target processing"). Since agent 10 moves successively from one PLC device 2 to the next, we shall refer to it as a "mobile agent". The system server transmits the generated mobile agent 10 to the PLC device 2 with node number 1 which is the first destination according to routing list. We will explain the routing list shortly.

System agent 11 recognizes that the target processing at node 1–4 has been completed which is defined in the mobile agent 10 as when the mobile agent 10 returns to the system agent 11, then the system agent 11 deletes the returned mobile agent 10.

The PLC 2 having node number 1–4 controls a control unit such as a sensor and actuator which performs the various processing defined in the mobile agent 10. After the processing at each node, the mobile agent is forwarded to the next PLC 2 or next destination according to the routing list.

Figure 2:
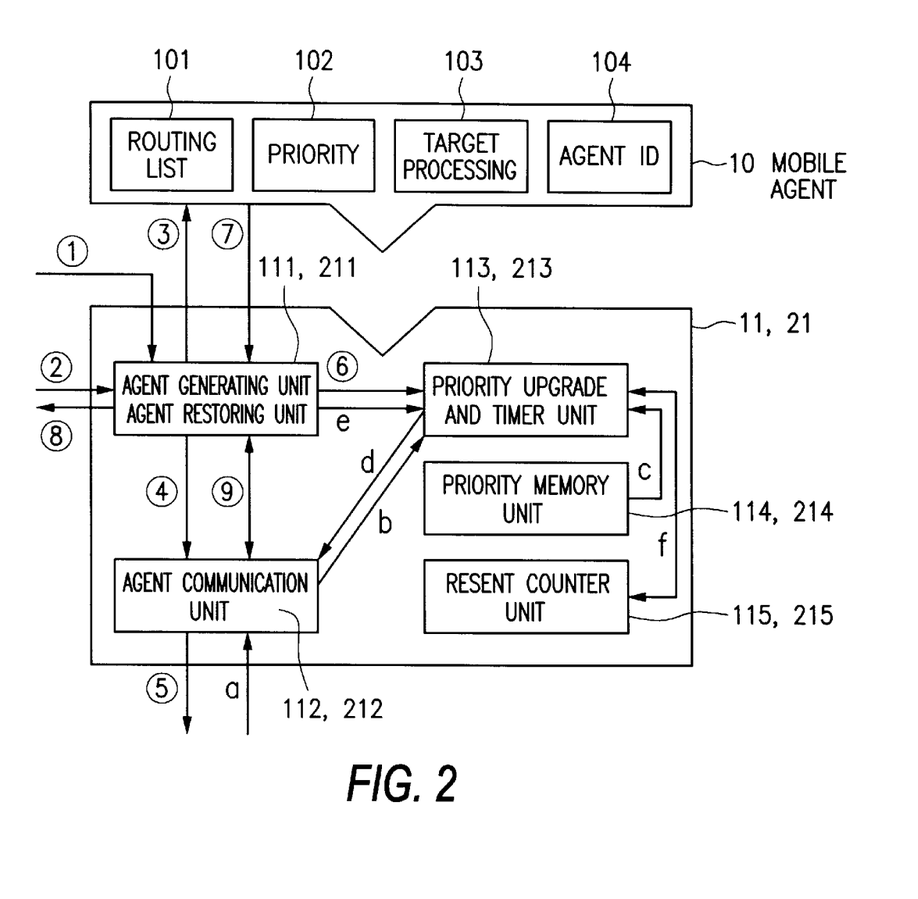
FIG. 2 is a block diagram of a system agent in the agent server shown in FIG. 1.

As explained above, mobile agent 10 is defined for each task by the OS (operating system). Mobile agent 10 consists of routing list 101, priority 102, target processing 103, and agent ID 104 as shown in FIG. 2.

The routing list 101 defines the node number of PLC 2 to which mobile agent 10 must pass and execute a designated processing. This node number is referred to as routing data.

The priority 102 defines the priority level of the mobile agent when a plurality of mobile agents are in a PLC 2. Based on this priority, a specific mobile agent having a higher priority is executed before other mobile agents having lower priority at the PLC 2.

The target processing 103 defines the processing to be executed at PLC 2 having a node number 1–4.

The agent ID 104 defines the individual mobile agent which is generated or restored.

We shall explain the system agent 11, 21 shown in FIG. 2. It consists of agent generating unit 111, 211, agent communication unit 112, 212, priority upgrade and timer unit 113, 213, priority memory unit 114, 214, and resent counter unit 115, 215.

When agent generating unit 111 receives a command from the control unit (not pictured) to generate a certain mobile agent (See (1) in FIG. 2), it reads out the specified source program stored in memory (See (2) in FIG. 2) and generates a mobile object. It generates mobile agent 10 with its attached routing list 101, priority 102, and agent ID 104 (See (3) in FIG. 2).

If agent generating unit 111 already has an identical mobile agent 10 in its memory, it will not necessary to recompile the source program to generate the object code, and the source program in the memory area can be used.

Agent generating unit 111 sets the standard priority in priority memory unit in the mobile agent 10 unless the user indicates a different priority other than standard. If the user indicates the different priority, the indicated priority is stored in the priority memory unit.

When agent generating unit 211 receives a command from the control unit (not pictured) to restore a certain mobile agent (See (1) in FIG. 2), it reads out the specified source program stored in memory (See (2) in FIG. 2) and restores a mobile object. It restores mobile agent 10 with an altered routing list 101 and/or priority 102 if they are to be altered as indicated by the control unit. (See (3) in FIG. 2.)

Agent generating unit 211, as in agent generating unit 111, sets the standard priority in priority memory unit 114, 214 in the mobile agent 10 unless the user indicates a different priority other than standard. If the user indicates the different priority, the indicated priority is stored in the priority memory unit 114, 214.

After agent generating unit 111, 211 generates or restores mobile agent 10, it transmits the mobile agent 10 to the next destination via agent communication unit 112, 212 (See (4), (5) in FIG. 2).

When agent generating unit 111, 211 completes the transmission of the mobile agent 10, it notifies the priority upgrade and timer unit 113, 213 of the priority of the mobile agent. (See (6) in FIG. 2).

Agent generating unit 111, 211 stores mobile agent 10 in the memory area when it receives mobile agent 10 from another PLC 2 (See (8) in FIG. 2).

Before agent generating unit 111, 211 transmits the generated or restored mobile agent 10, it requires agent communication unit 112, 212 to query the designated PLC 2 for the agent ID and the priority of other mobile agents which are already there. Upon receipt of the agent ID and priority of other mobile agents (See (9) in FIG. 2), this information is then forwarded to priority upgrade and timer unit 113, 213 (See (6) in FIG. 2).

Agent communication unit 112, 212 queries the system agent 111, 211 of the designated PLC 2 to which the mobile agent is to be transmitted for the agent ID and the priority of other mobile agents that are already there (See (a) in FIG. 2). This inquiry is forwarded to the designated PLC 2 upon the request from agent generating unit 111, 211. The response for this inquiry is forwarded to priority upgrade and timer unit 113, 213 (See (b) in FIG. 2).

When priority upgrade and timer unit 113, 213 receives an inquiry from agent server 1 or other PLC 2 via agent communication unit 112, 213 for the agent ID and the priority of the mobile agents which this PLC 2 currently has (See (b) in FIG. 2), this unit reads out such agent ID and priority of these mobile agents stored in priority memory unit 114, 214 (See (c) in FIG. 2). The priority memory unit 114, 214 will be explained shortly. The agent ID and priority are forwarded to the original agent server 1 or other PLC 2 via agent communication unit 212 (See (d) in FIG. 2).

When priority upgrade and timer unit 113, 213 is notified from agent generating unit 111, 212 that a mobile agent 10 has been transmitted (see (e) in FIG. 2), a predetermined time period is set up at a timer (not shown here). If no response for the receipt of the mobile agent comes back from the designated PLC 2 after the redetermined time period elapses, this unit determines a time out, and adds 1 to the resent counter in resent counter unit 115 (See (f) in FIG. 2).

Priority upgrade and timer unit 113, 213 compares the priority of the mobile agents defined by ID which are already in the designated PLC 2 (here after referred as waiting mobile agent) with the priority of the mobile agent 10 to be transmitted shortly (here after referred as transmitting mobile agent). If the transmitting mobile agent should be executed at the destination with higher priority than others, and the priority of the waiting mobile agent is higher than the priority of the transmitting mobile agent, priority upgrade and timer unit 113, 213 will add the predetermined value of "t" to the priority of the transmitting mobile agent to upgrade the priority. The transmitting mobile agent with the upgraded priority is, again, forwarded to the destination of PLC 2.

Figure 3:
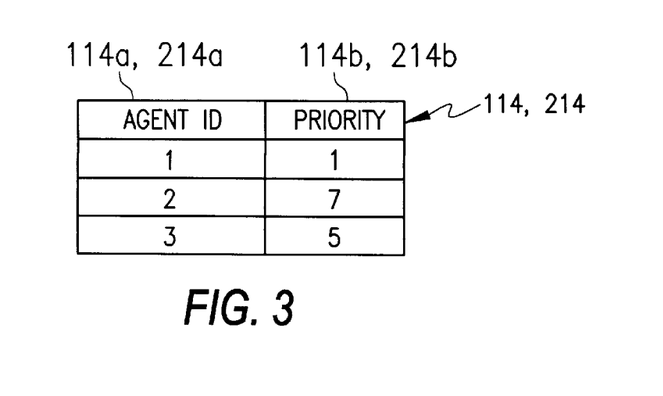
FIG. 3 is a table showing the contents of the priority memory unit shown in FIG. 2.

Priority memory unit 114, 214 consists of agent ID area 114a, 214a, and priority area 114b, 214b as shown in FIG. 3. In agent ID area 114a, 214a, the mobile agent ID of the mobile agents 10 in waiting are stored. In priority area 114b, 214b, the priority of the individual waiting mobile agents 10 is stored.

The mobile agent with higher priority is executed faster than other agents with lower priority.

Figure 4:
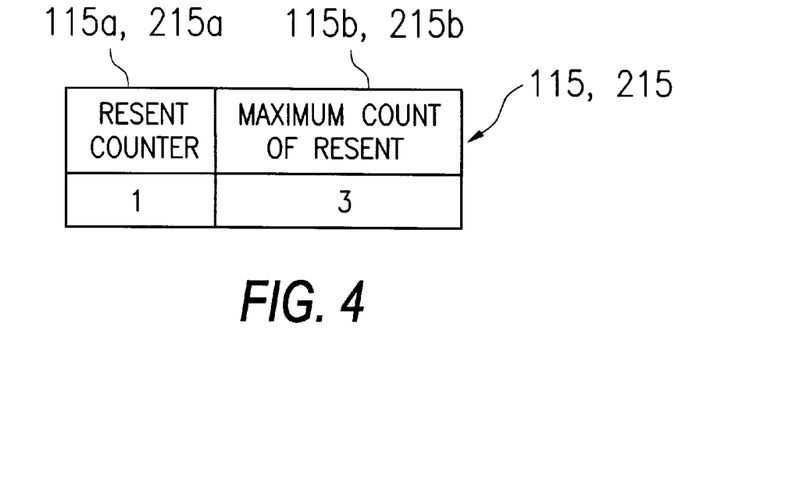
FIG. 4 is a table showing the contents of the reset count unit shown in FIG. 2.

Resent counter unit 115, 215 consists of, as shown in FIG. 4, resent counter 115a, 215a and maximum count of resent 115b, 215b. In resent counter 115a, 215a, the resent count is stored which indicates how many times the mobile agent 10 has been resent. Maximum count of resent 115b, 215b is the maximum count of allowed resent before the system judges as transmission error of the agent.

We shall now explain the operation of this agent system, which can be divided into three flowcharts, (1) an overall flow chart of this agent system, (2) a flowchart showing altering the priority and altering the destination, and (3) a flowchart showing resending a mobile agent.

(1) Overall Flow Chart of this Agent System

Figure 5:
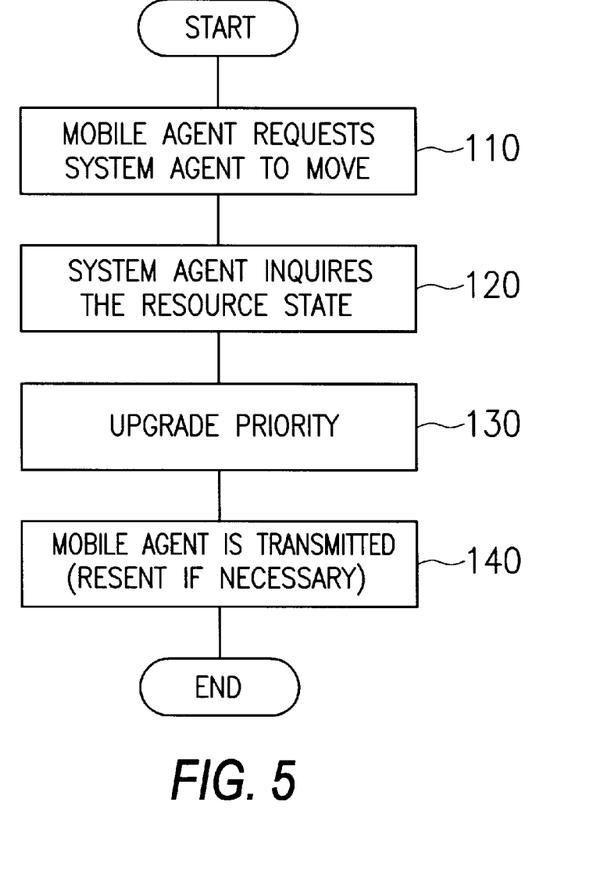
FIG. 5 is an overall flowchart of the agent system shown in FIG. 1.

FIG. 5 is an overall flowchart of this agent system according to this embodiment.

When mobile agent 10 requests system agent 11 of PLC 2 to move to a destination (step 110), the system agent 11 inquires the resource state of the destination (step 120).

When system agent 11 receives a priority information consisting of ID number of the waiting mobile agents 10 at the destination and the priorities, the system agent 11 alters the priority of the generated or restored transmitting mobile agent 10 in view of the received priority data of the waiting mobile agents (step 130).

If the transmitting mobile agent 10 does not have a high priority, a predetermined standard priority is set for the transmitting mobile agent 10.

The system agent 11 then transmits the mobile agent 10 to the destination (step 140), and finishes this processing.

(2) Altering the Priority and Altering the Destination

Figure 6:
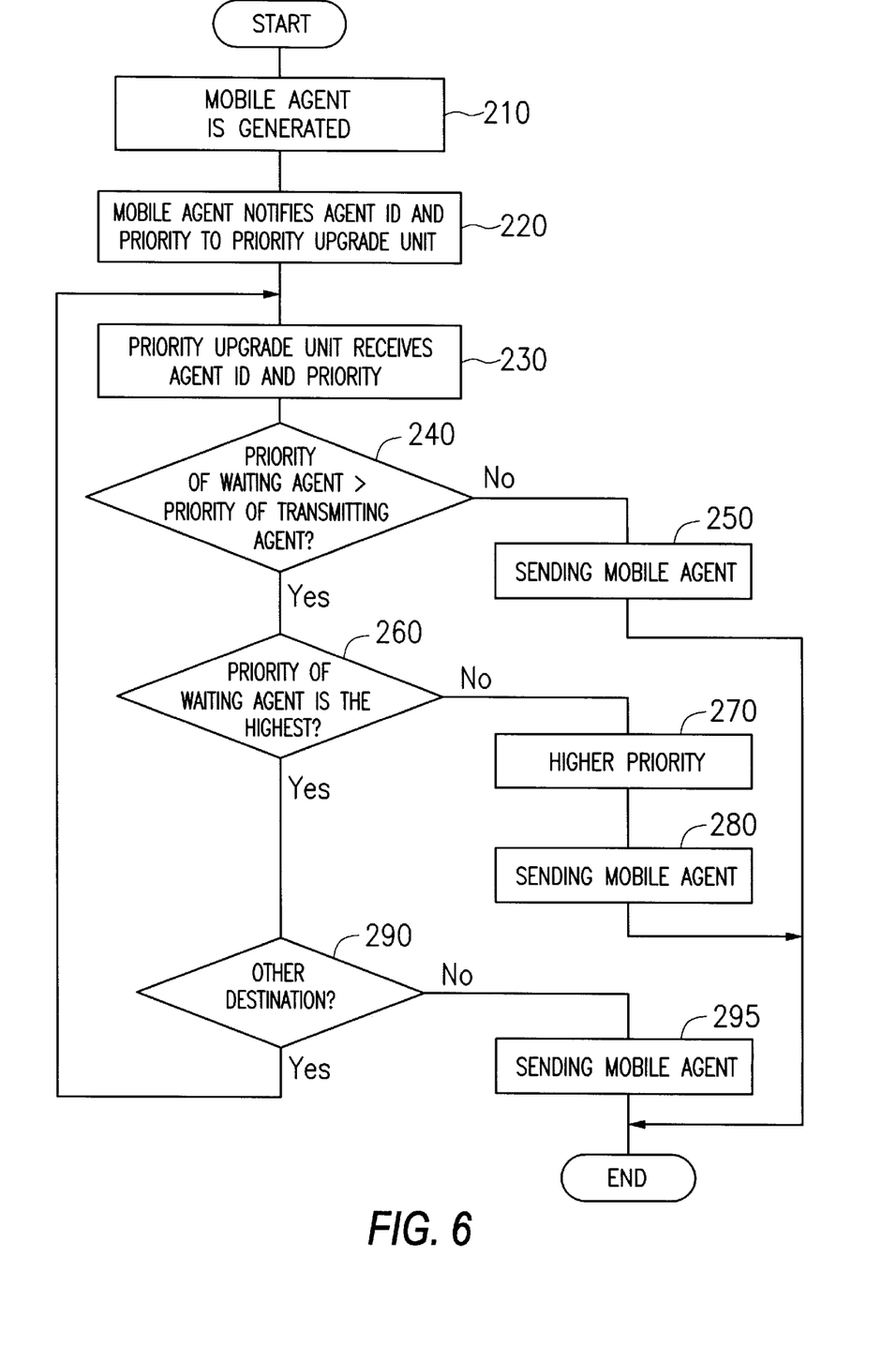
FIG. 6 is a flowchart showing alteration of the priority and the destination of the agent.

FIG. 6 is a flowchart in this agent system to alter the priority and the destination of the agent. When agent generating unit 111 receives a command to generate a certain mobile agent 10, it reads out the specified source program or the object code of the source program stored in memory to generate a mobile object 10 (step 210).

Agent generating unit 111 notifies the priority upgrade and timer unit 113 of the agent ID and the priority of the transmitting agent (step 220). Agent generating unit 111 then requests the system agent 21 at the designation to read out the mobile agent ID and the priority stored in priority memory unit 214, and send them to system agent 11.

Priority upgrade and timer unit 113 receives the agent ID and the priority of the waiting agents at the destination PLC 2 (step 230).

Priority upgrade and timer unit 113 compares the priority of the transmitting agent with the priorities of the waiting mobile agents (step 240). If the priorities of the waiting mobile agents are not higher than the priority of the transmitting mobile agent (No in step 240), priority upgrade and timer unit 113 indicates agent generating unit 111 to transmit the transmitting mobile agent to the destination, and agent generating unit 111 transmits the generated mobile agent 10 to the destination PLC 2 (step 250), and finishes this processing.

If priority upgrade and timer unit 113 judges that the priorities of the waiting mobile agents are higher than the priority of the transmitting mobile agent (Yes in step 240), it further judges if the priorities of the waiting mobile agent have the highest priority value (step 260).

If not the highest (No in step 260), priority upgrade and timer unit 113 instructs agent generating unit 111 to add value "t" to the current priority of the transmitting mobile agent in order to create a new higher priority.

When agent generating unit 111 receives the instruction mentioned above from priority upgrade and timer unit 113, it adds value "t" to the current priority of the transmitting mobile agent in order to create a new higher priority (step 270), and transmits the mobile agent to the destination, PLC 2, then finishes this processing.

When agent priority upgrade and timer unit 113 judges the priority of the waiting mobile agent has already the highest value (Yes in step 260), it can not set the higher priority, so further judges if there is other destination (node) for the mobile agent to be transferred (step 290). If there is other destination (Yes in step 290), it returns to step 230, and processes the same steps for the destination. If there is no other destination (node) for the mobile agent (No in step 290), the mobile agent 10 is transmitted to the first destination (in this case, the mobile agent will be not the highest priority in the destination).

When agent generating unit 111 receives an instruction from priority upgrade and timer unit 113 to transmit mobile agent 10, it will transmit the mobile agent (No in step 295), and finish this processing.

(3) Resending the Mobile Agent

Figure 7:
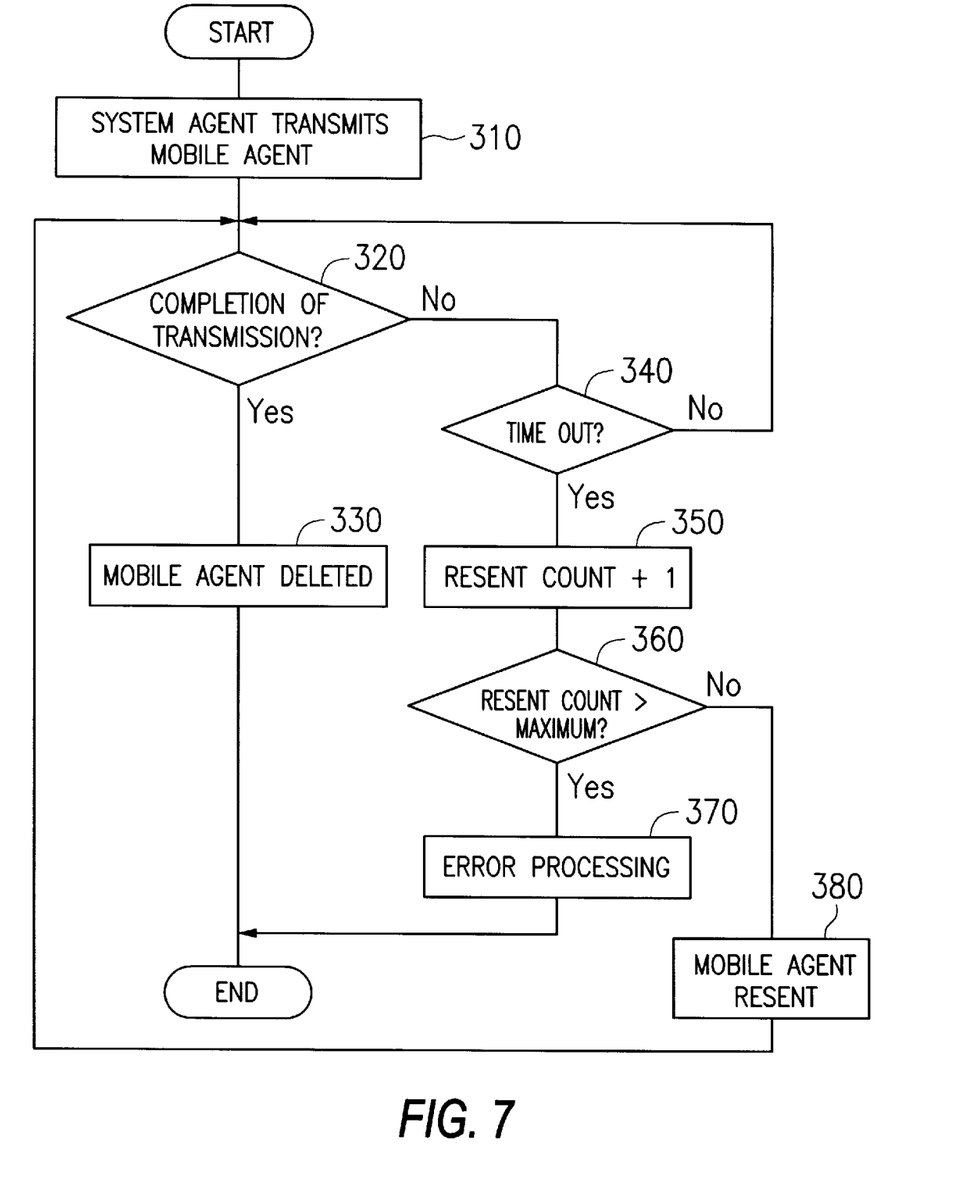
FIG. 7 is a flowchart illustrating retransmission of an agent.

FIG. 7 is a flowchart in this agent system for the retransmission. Agent generating unit 111 transmits the generated mobile agent 10 to the system agent of the destination, PLC 2 (step 310), and notifies the priority upgrade and timer unit 113 of the completion of the transmission.

When priority upgrade and timer unit 113 receives the notification from agent generating unit 111, it activates the timer and starts the time counting.

Agent generating unit 111 then judges if it received the notification of completion for transmitting the mobile agent 10 from the destination (step 320). If Yes (Yes in step 320), it deletes mobile agent stored in the memory unit (step 330), and finishes this processing.

If agent generating unit 111 did not receive notification of completion (No in step 320), it notifies priority upgrade and timer unit 113 of this fact.

Priority upgrade and timer unit 113 will then judge whether there was a time out (a time out occurs if the time which was set in the timer unit elapses) (step 340).

If priority upgrade and timer unit 113 judges there is still no time out (No in step 340), it returns the processing to step 320, and repeats the same processing. If it judges there was a time out (Yes in step 340), the mobile agent is resent. Resent count "n" stored in resent count unit 115 is updated to "n+1" (step 370) as the new resent count n.

Priority upgrade and timer unit compares resent count 115a and maximum count of resent 115b. If the resent count reaches the maximum count, it will judge that an error has occurred at the mobile agent 10 which was sent to PLC 2, and execute the error routine (step 370), and it finishes this processing.

If the resent count is smaller than the maximum count (No in step 360), the mobile agent 10 will be resent to the destination PLC 2 and it returns to step 320 to repeat the steps mentioned above.

According to the invention disclosed above, we can achieve the following effects.

(1) In this agent system, the system agent generates mobile agent 10 which has an individual priority level to be processed at the destination, PLC 2. This mobile agent is transmitted to the destinations based on the routing list. Once the mobile agent reaches to the destination, this mobile will be prioritized among other waiting mobile agents which are already there. This configuration can make, therefore, the system more flexible for the processing at the destination.

(2) Before the mobile agent 10 (transmitting mobile agent) is transmitted to the destination, PLC 2, the system server will inquire the destination, PLC 2 for the priority of the mobile agents which are already at the destination (waiting mobile agents). It compares the priority of the transmitting mobile agent and the priority of the waiting mobile agents. If the later has higher priority than the former, the priority of the former (transmitting mobile agent) will be upgraded to higher priority than the priority of the waiting mobile agents if the system user wishes to process the transmitting mobile agent with high priority. This enhances the system by making it more flexible than the prior art.

(3) When mobile agent 10 is transmitted to the destination, PLC 2, the system agent counts the elapsed time until it receives the confirmation that the transmitted agent is executed at the destination. If the elapsed time exceeds the predetermined time, the system server will resend the mobile agent for a predetermined number of times. If the resent count exceeds the predetermined number of times, the system will determine that an error has occurred at the destination. This configuration, therefore, makes it easier to detect such error at the destination.

What is claimed is:

1. An agent system in which an agent server and a number of communication devices at a number of destinations are connected via a communication system, said agent system comprising:

a transmitting mobile agent to be transmitted in said agent system, said transmitting mobile agent comprising a routing list having routing data, a priority, a target processing, and an agent ID;

a first system agent in said agent server having an agent generating means to generate and transmit said transmitting mobile agent to said communication devices; and a second system agent in said communication device having an agent restoring means to restore said transmitting mobile agent into an object code and execute said target processing based on said priority.

2. An agent system according to claim 1, further comprising a priority inquiring means to inquire a priority of waiting mobile agent in said second system agent before said transmitting mobile agent is transmitted to said second system agent.

3. An agent system according to claim 2, further comprising a priority altering means to upgrade said priority of said transmitting mobile agent if said priority of said waiting mobile agent is higher than said priority of said transmitting mobile agent.

4. An agent system according to claim 3, wherein said agent generating means in said first system agent tries to move said transmitting mobile agent to other communication devices if said priority of said waiting mobile agent is the highest, and it is not possible to upgrade said priority of said transmitting mobile agent.

5. An agent system according to claim 1, further comprising a time out detecting means to detect a time out, wherein said agent generating unit resends said transmitting mobile agent to said communication devices.

6. An agent system according to claim 5, further comprising an error detecting means to detect a transmission error to said communication device by counting said resending of said transmitting mobile agent.

* * * * *